(12) United States Patent
Yao et al.

(10) Patent No.: US 9,576,548 B2
(45) Date of Patent: Feb. 21, 2017

(54) ELECTROMAGNETIC-TYPE TOUCH PANEL, METHOD FOR DRIVING AND DETECTING ELECTROMAGNETIC-TYPE TOUCH PANEL, AND COORDINATE INPUT DEVICE

(71) Applicants: Shanghai Tianma Micro-Electronics Co., Ltd., Shanghai (CN); Tianma Micro-Electronics Co., Ltd., Shenzhen (CN)

(72) Inventors: Qijun Yao, Shanghai (CN); Feng Lu, Shanghai (CN); Xianxiang Zhang, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 65 days.

(21) Appl. No.: 14/602,222

(22) Filed: Jan. 21, 2015

(65) Prior Publication Data
US 2016/0026271 A1 Jan. 28, 2016

(30) Foreign Application Priority Data
Jul. 22, 2014 (CN) .......................... 2014 1 0350971

(51) Int. Cl.
*G06F 3/046* (2006.01)
*G06F 3/041* (2006.01)
(Continued)

(52) U.S. Cl.
CPC ................. *G09G 5/00* (2013.01); *G06F 3/046* (2013.01); *G06F 3/0416* (2013.01)

(58) Field of Classification Search
CPC ...... G06F 3/033; G06F 3/0334; G06F 3/0338; G06F 3/046; G06F 3/03545; G06F 2003/04105
See application file for complete search history.

(56) References Cited

U.S. PATENT DOCUMENTS 3,904,822 A * 9/1975 Kamm .................... G06F 3/046
178/19.03
4,725,978 A * 2/1988 Fujioka ............... G06F 3/03545
345/173

(Continued)

FOREIGN PATENT DOCUMENTS

CN 102262495 A 11/2011

*Primary Examiner* — Kent Chang
*Assistant Examiner* — William Lu
(74) *Attorney, Agent, or Firm* — Alston & Bird LLP (57) ABSTRACT

A touch panel is disclosed. The touch panel is detects a position of a stylus, which includes first and second resonance circuits. The touch panel includes first and second coils respectively extending in first and second directions. Each of the first coils emits a first signal having a first frequency and receives a second signal having a second frequency, where emitting the first signal and receiving the second signal are successively and respectively performed by the plurality of second coils. In addition, each of second coils emits a second signal having the second frequency and receives a first signal having the first frequency, where emitting the second signal and receiving the first signal are successively performed. The first resonance circuit of the stylus generates the first signal after receiving the first signal, and the second resonance circuit of the electromagnetic stylus generates the second signal after receiving the second signal.

20 Claims, 11 Drawing Sheets (51) Int. Cl.
*G06F 3/0354* (2013.01)
*G06F 3/038* (2013.01)
*G09G 5/00* (2006.01)

(56) References Cited

U.S. PATENT DOCUMENTS

| | | | |
|---|---|---|---|
| 6,738,050 B2* | 5/2004 | Comiskey | B41J 3/4076 345/107 |
| 9,262,034 B2* | 2/2016 | Yao | G06F 3/0383 |
| 2001/0001430 A1* | 5/2001 | Ely | G01D 5/2073 178/18.03 |
| 2002/0041272 A1* | 4/2002 | Ohashi | G06F 3/03545 345/173 |
| 2002/0148655 A1* | 10/2002 | Cho | G06F 3/03542 178/18.09 |
| 2003/0062889 A1* | 4/2003 | Ely | G01D 5/2073 324/207.17 |
| 2003/0112220 A1* | 6/2003 | Yang | G06F 3/03545 345/156 |
| 2003/0142073 A1* | 7/2003 | Fukushima | G06F 3/046 345/158 |
| 2003/0151596 A1* | 8/2003 | Moyne | G06F 3/043 345/173 |
| 2004/0039545 A1* | 2/2004 | Katsurahira | G06F 3/046 702/150 |
| 2004/0169439 A1* | 9/2004 | Toda | B06B 1/0655 310/328 |
| 2004/0189587 A1* | 9/2004 | Jung | G02F 1/13338 345/102 |
| 2004/0260507 A1* | 12/2004 | Chang | G06F 3/0346 702/152 |
| 2005/0128191 A1* | 6/2005 | Katsurahira | G06F 1/3203 345/179 |
| 2005/0171714 A1* | 8/2005 | Ely | G06F 1/3203 702/75 |
| 2006/0012581 A1* | 1/2006 | Haim | G06F 3/046 345/173 |
| 2006/0279549 A1* | 12/2006 | Zhang | G06F 3/03545 345/173 |
| 2007/0085836 A1* | 4/2007 | Ely | G06F 3/03545 345/173 |
| 2007/0195009 A1* | 8/2007 | Yamamoto | G06F 1/1652 345/1.1 |
| 2007/0205996 A1* | 9/2007 | Huang | G06F 3/03545 345/179 |
| 2008/0076351 A1* | 3/2008 | Washiro | H04B 5/0031 455/41.1 |
| 2008/0150918 A1* | 6/2008 | Hagen | G06F 3/046 345/179 |
| 2010/0085325 A1* | 4/2010 | King-Smith | G06F 3/03545 345/174 |
| 2010/0321315 A1* | 12/2010 | Oda | G06F 3/044 345/173 |
| 2012/0050231 A1* | 3/2012 | Westhues | G06F 3/03545 345/179 |
| 2014/0085259 A1* | 3/2014 | Lee | G06F 3/0488 345/174 |
| 2014/0132529 A1* | 5/2014 | Jeong | G06F 3/044 345/173 |
| 2015/0002457 A1* | 1/2015 | Woo | G06F 3/03545 345/174 |

* cited by examiner

ELECTROMAGNETIC-TYPE TOUCH PANEL, METHOD FOR DRIVING AND DETECTING ELECTROMAGNETIC-TYPE TOUCH PANEL, AND COORDINATE INPUT DEVICE

CROSS-REFERENCES TO RELATED APPLICATIONS

This application claims the benefit of priority to Chinese Patent Application No. 201410350971.9, filed with the Chinese Patent Office on Jul. 22, 2014 and entitled "ELECTROMAGNETIC-TYPE TOUCH PANEL, METHOD FOR DRIVING AND DETECTING ELECTROMAGNETIC-TYPE TOUCH PANEL, AND COORDINATE INPUT DEVICE", the content of which is incorporated herein by reference in its entirety.

TECHNICAL FIELD

The present disclosure relates to the field of inductive touch, in particular, to an electromagnetic-type touch panel, a method for driving and detecting the electromagnetic-type touch panel and a coordinate input device including the electromagnetic-type touch panel.

BACKGROUND OF THE INVENTION

Recently, with the development of humanization and facilitation, touch panels, display panels and display devices with touch function become more and more popular. Based on different working principles, there exist several types of touch panels, such as a resistive-type touch panel, a capacitive-type touch panel, and an electromagnetic-type touch panel. The resistive-type touch panel and the capacitive-type touch panel may be operated by a hand directly. In the case that a stylus is adopted to write, it is difficult to accurately distinguish a touch of the hand from that of the stylus since the hand generally contacts the touch panel. The electromagnetic-type touch panel mainly includes multiple electromagnetic induction coils or antennas, arranged in an X-direction and in a Y-direction, and a positioning device (e.g., an electromagnetic stylus). A location of an electromagnetic stylus can be accurately recognized by the electromagnetic-type touch panel even if the hand is on the panel.

Figure 1A:
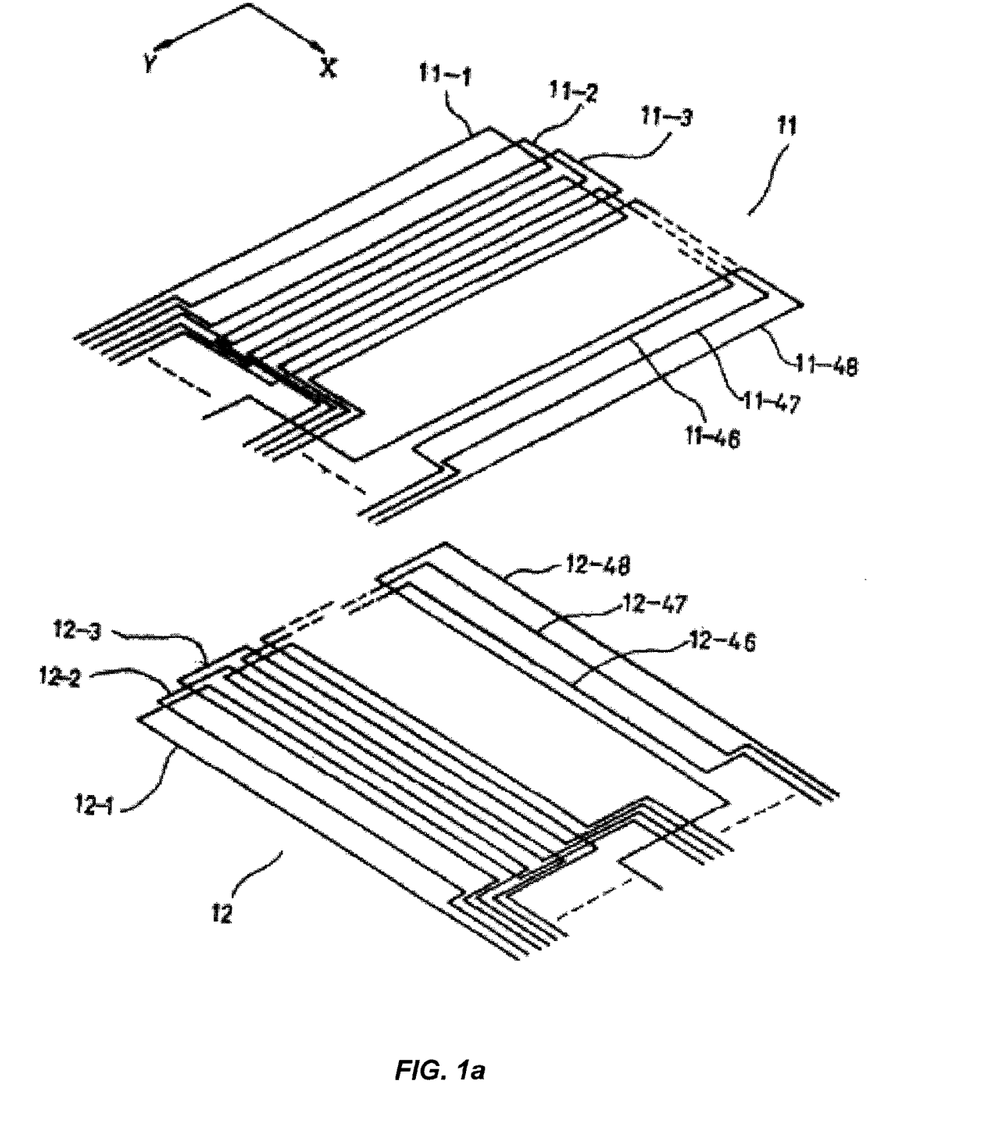
FIG. 1a is a structural schematic diagram of a conventional electromagnetic-type touch panel.
Figure 1B:
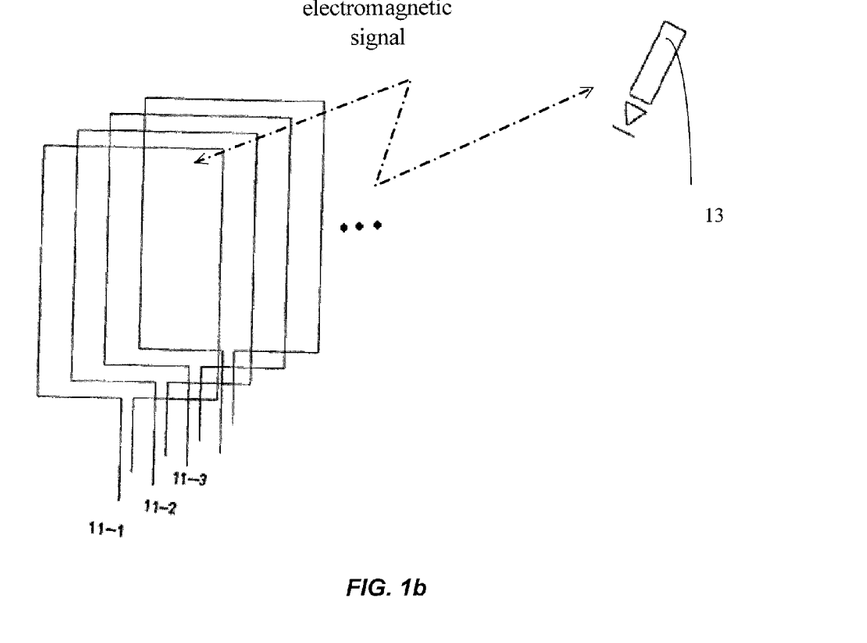
Figure 1C:
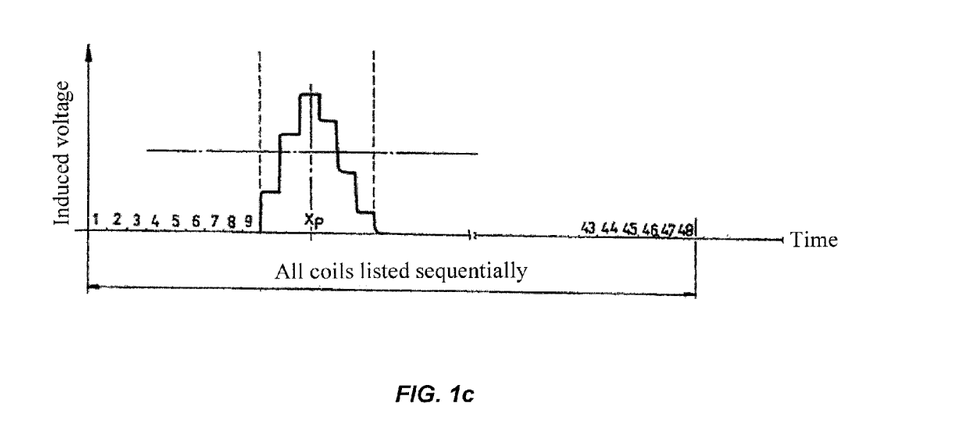
FIG. 1c is an diagram of induced voltages detected from the first coils shown in FIG. 1b.

FIG. 1a is a structural schematic diagram of a conventional electromagnetic-type touch panel. As can be seen from FIG. 1a, the electromagnetic-type touch panel includes: first coils 11 (including 11-1, 11-2, 11-3 . . . , 11-48) arranged in an X-direction and extending in a Y-direction, and second coils 12 (including 12-1, 12-2, 12-3 . . . , 12-48) arranged in the Y-direction and extending in the X-direction. Normally, the first coils 11 and the second coils 12 are crossed with each other and are insulated from each other, and both the first coils 11 and the second coils 12 are disposed on a substrate (not shown in FIG. 1a). Taking the first coils 11 as an example and in conjunction with FIGS. 1b and 1c, a method for driving and detecting the conventional touch panel is described. After being applied with a drive signal and emitting an electromagnetic signal, each first coil receives an electromagnetic signal reflected by an electromagnetic stylus and generates an induction signal. The first coil 11-1 is applied with the driving signal and thereby emits an electromagnetic signal. The electromagnetic stylus 13 receives the electromagnetic signal emitted by the first coil 11-1, and a resonance circuit (e.g., an LC resonance circuit) in the electromagnetic stylus 13 generates, through resonance, an electromagnetic signal (i.e., a reflected signal) having a same frequency as the electromagnetic signal emitted by the first coil 11-1, and emits the generated reflected signal. The first coil 11-1 generates an induced signal (which is generally an induced voltage) after receiving the electromagnetic signal reflected by the electromagnetic stylus. Similarly, the first coils 11-2, 11-3, . . . , 11-48 each generates an induced signal. Thus, 48 induced signals are generated. Then a function fitting (e.g., a quadratic function fitting) is performed on the 48 induced signals, and a peak (Xp) of a fitted curve is taken as an X-direction coordinate of a touch position of the electromagnetic stylus. A Y-direction coordinate of the touch position of the electromagnetic stylus may be determined similarly.

With the above touch panel and the method for driving and detecting the touch panel, the touch position of the electromagnetic stylus may be determined properly. However, the driving and detecting efficiency needs to be improved.

BRIEF SUMMARY OF THE INVENTION

One inventive aspect is an electromagnetic-type touch panel, configured to detect a touch position of an electromagnetic stylus, where the electromagnetic stylus includes a first resonance circuit and a second resonance circuit. The electromagnetic-type touch panel includes a plurality of first coils extending in a first direction and a plurality of second coils extending in a second direction. Each of the plurality of first coils is configured to emit a first electromagnetic signal having a first frequency and to receive a second reflected signal having a second frequency, where emitting the first electromagnetic signal and receiving the second reflected signal are successively performed. In addition, each of the plurality of second coils is configured to emit a second electromagnetic signal having the second frequency and to receive a first reflected signal having the first frequency, where emitting the second electromagnetic signal and receiving the first reflected signal are successively and respectively performed by the plurality of second coils. The first resonance circuit of the electromagnetic stylus generates the first reflected signal after receiving the first electromagnetic signal, and the second resonance circuit of the electromagnetic stylus generates the second reflected signal after receiving the second electromagnetic signal.

Another inventive aspect is a method of driving and detecting an electromagnetic-type touch panel, configured to detect a touch position of an electromagnetic stylus. The method includes successively applying a first driving signal to and detecting first induced signals from a plurality of first coils extending in a first direction in the electromagnetic-type touch panel, and successively applying a second driving signal to and detecting second induced signals from a plurality of second coils extending in a second direction in the electromagnetic-type touch panel. Each of the first coils is configured to emit a first electromagnetic signal having a first frequency, where a first resonance circuit in the electromagnetic stylus is configured to generate one first reflected signal having the first frequency after receiving each of the first electromagnetic signals having the first frequency. In addition, each of the second coils is configured to emit a second electromagnetic signal having a second frequency, where a second resonance circuit in the electromagnetic stylus is configured to generate one second reflected signal having the second frequency after receiving each of the second electromagnetic signals having the second frequency. Furthermore, the first coils respectively receive the second reflected signal, and the second coils respectively receive the first reflected signal.

BRIEF DESCRIPTION OF THE DRAWINGS

FIG. 1b illustrates a principle of driving and detecting first coils shown in the FIG. 1a;

In FIG. 5a-FIG. 6c, reference sign "Em" represents an emission process and reference sign "Re" represents a reception process.

DETAILED DESCRIPTION OF THE PREFERRED EMBODIMENTS

With the present application, a touch position of an electromagnetic stylus on an electromagnetic-type touch panel is determined. Two electromagnetic signals having different frequencies are used, and the electromagnetic stylus correspondingly has two resonance circuits with different frequencies. Thus, in an X-direction, a driving signal has a different frequency from that of an induced signal, and in a Y-direction, a driving signal also has a different frequency from that of an induced signal. Therefore, coordinates in the X-direction and in the Y-direction may be detected simultaneously, thereby greatly accelerating the determination of the touch position of the electromagnetic stylus on the electromagnetic panel and improving the driving and detecting efficiency.

A First Embodiment

Figure 2A:
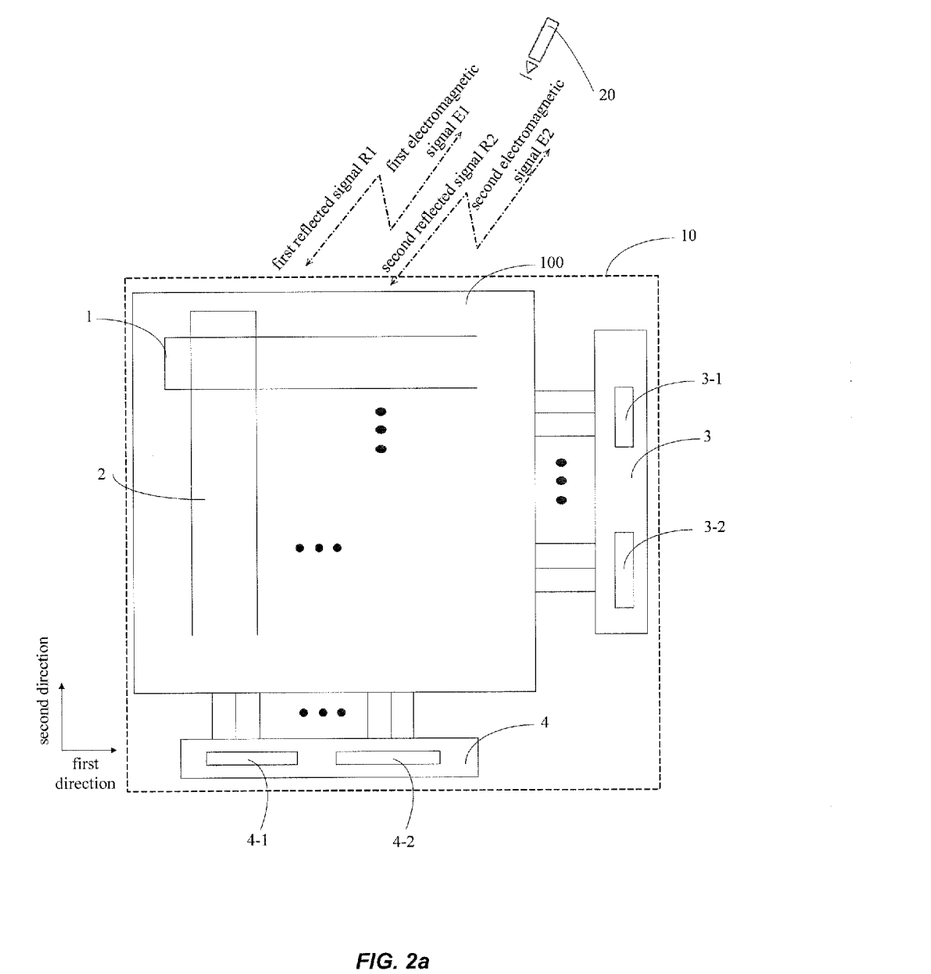
FIG. 2a is a structural block diagram of a coordinate input device according to an embodiment of the present application.

FIG. 2a is a structural block diagram of a coordinate input device according to an embodiment of the present application. As shown in FIG. 2a, the coordinate input device includes an electromagnetic-type touch panel 10 and an electromagnetic stylus 20. The electromagnetic-type touch panel 10 mainly includes: a first substrate 100; multiple first coils 1 extending in a first direction (e.g., an X-direction) and multiple second coils 2 extending in a second direction (e.g., a Y-direction), the first coils 1 and the second coils 2 being located on the first substrate 100; and a first direction driving and detecting circuit 3 electrically connected to the first coils 1, and a second direction driving and detecting circuit 4 electrically connected to the second coils 2. The multiple first coils 1 are arranged in parallel along the second direction, and the multiple second coils 2 are arranged in parallel along the first direction. The first coils 1 and the second coils 2 may be U-shaped coils as illustrated in FIG. 2a. The first coils 1 intersect (preferably vertically intersect) with the second coils 2, and the first coils 1 are insulated from the second coils 2. Each of the first coils 1 has two terminals (not illustrated in FIG. 2a), one terminal is connected to the ground (not shown in FIG. 2a), and the other terminal is a terminal for inputting and outputting signals. Each of the second coils 1 has two terminals (not illustrated in FIG. 2a), one terminal is connected to the ground (not shown in FIG. 2a), and the other terminal is a terminal for inputting and outputting signals. It should be noted that, adjacent first coils may overlap with each other or not, and adjacent second coils may overlap with each other or not. Furthermore, the number of the first coils or the second coils may be any integer.

Figure 2B:
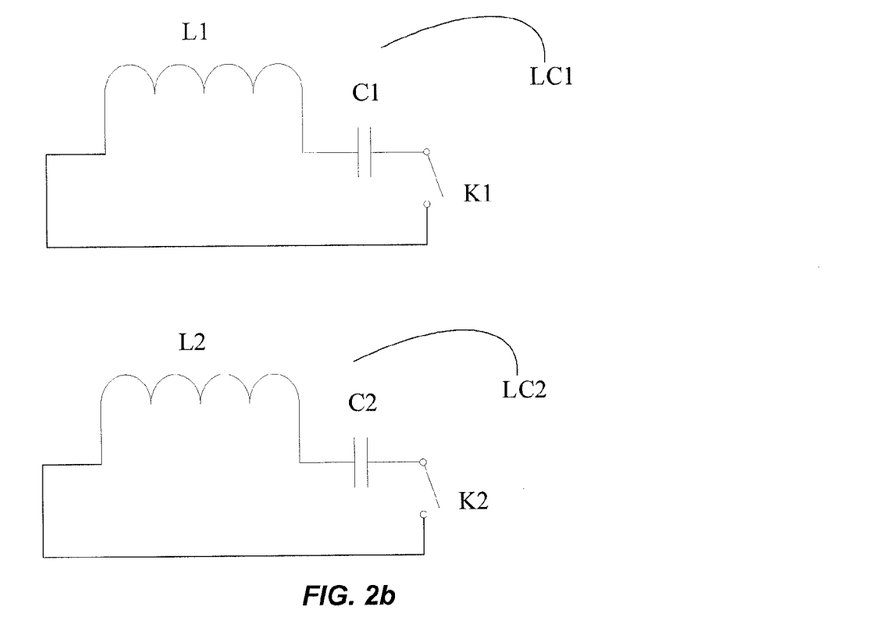
FIG. 2b is a structural schematic diagram of a resonance circuit in an electromagnetic stylus according to an embodiment of the present application.

Normally, the electromagnetic stylus 20 is passive, i.e., the electromagnetic stylus 20 does not need an additional power supply. As shown in FIG. 2b, the electromagnetic stylus 20 includes a first resonance circuit LC1 and a second resonance circuit LC2. The first resonance circuit LC1 includes an inductor L1, a capacitor C1 and a switch K1 which are connected in series to form a closed loop, i.e., an LC resonance circuit. The second resonance circuit LC2 includes an inductor L2, a capacitor C2 and a switch K2 which are connected in series to form a closed loop, i.e., an LC resonance circuit. When the electromagnetic-type touch panel 10 is pressed by a tip (not shown in FIG. 2b) of the electromagnetic stylus 20, the switches K1 and K2 are turned on, and the first resonance circuit LC1 and the second resonance circuit LC2 are in a working state. When the electromagnetic-type touch panel 10 is not pressed by the tip of the electromagnetic stylus 20, the switches K1 and K2 are turned off, and the first resonance circuit LC1 and the second resonance circuit LC2 are in a non-working state. Furthermore, one switch may be used as both switches K1 and K2.

According to an embodiment in conjunction with FIG. 2a, FIG. 2b, FIG. 3a, FIG. 3b and FIG. 3c, it is explained how to drive and detect the electromagnetic-type touch panel 10, in the case that the first resonance circuit LC1 and the second resonance circuit LC2 are in the working state, to determine a touch position of the electromagnetic stylus 20. In general, a first direction driving and detecting circuit 3 provides a first driving signal (an f1 driving signal) to and detects a first induced signal (an f2 induced signal) from a first coil of the multiple first coils 1 one by one; and a second direction driving and detecting circuit 4 provides a second driving signal (an f2 driving signals) to and detects a second induced signal (an f1 induced signals) from the multiple second coils 2 one by one. Multiple first coils 1 (e.g., 1-1, 1-2, 1-3), successively, emit a first electromagnetic signal E1 having a first frequency (f1) and receive a second reflected signal R2 having a second frequency (f2); and multiple second coils 2 (e.g., 2-1, 2-2, 2-3), successively, emit a second electromagnetic signal E2 having the second frequency (f2) and receive a first reflected signal R1 having the first frequency (f1) Each of the multiple first coils performs a process of emitting a first electromagnetic signal E1 having a first frequency (f1) and receiving a second reflected signal R2 having a second frequency (f2), processes of emitting the first electromagnetic signals and receiving the second reflected signals are successively and respectively performed by the multiple first coils; and each of the multiple second coils performs a process of emitting a second electromagnetic signal E2 having the second frequency (f2) and receiving a first reflected signal R1 having the first frequency (f1), processes of emitting the second electromagnetic signals and receiving the first reflected signals are successively and respectively performed by the multiple second coils. The first resonance circuit LC1 receives the first electromagnetic signal E1 emitted from one of the multiple first coils 1, and then generates, through resonance, the first reflected signal R1 having a same frequency as the first electromagnetic signal E1; and the second resonance circuit LC2 receives the second electromagnetic signal E2 emitted from one of the multiple second coils 2, and then generates, through resonance, the second reflected signal R2 having a same frequency as the second electromagnetic signal E2; where f1 is not equal to f2.

Figure 3A:
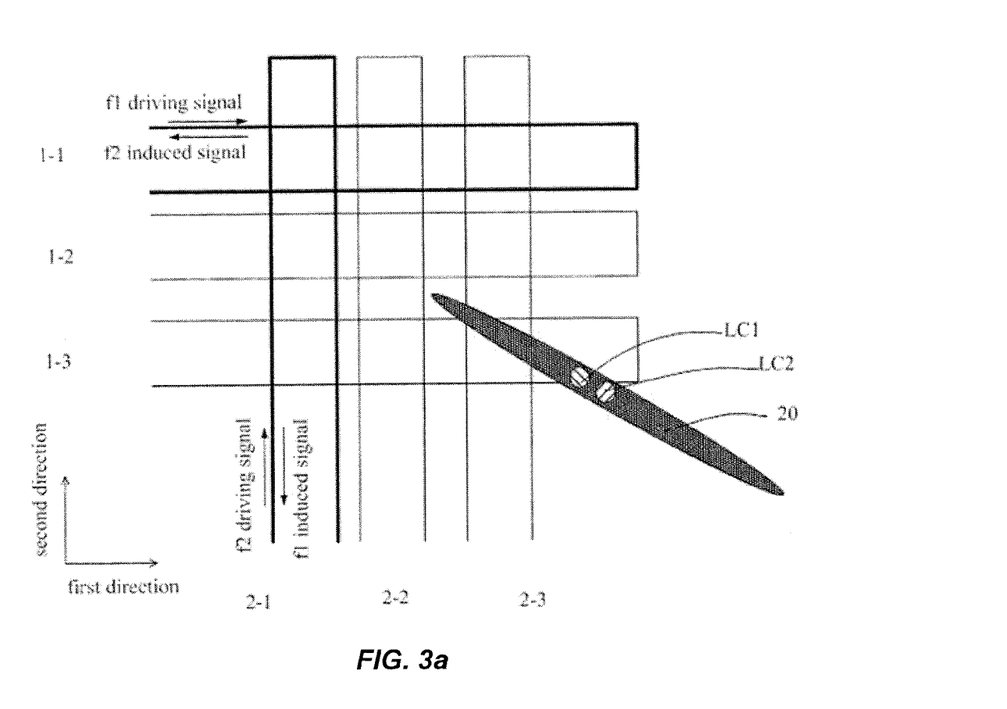
FIG. 3a illustrates a principle of driving and detecting a first one of first coils and a first one of second coils according to an embodiment of the present application.
Figure 3B:
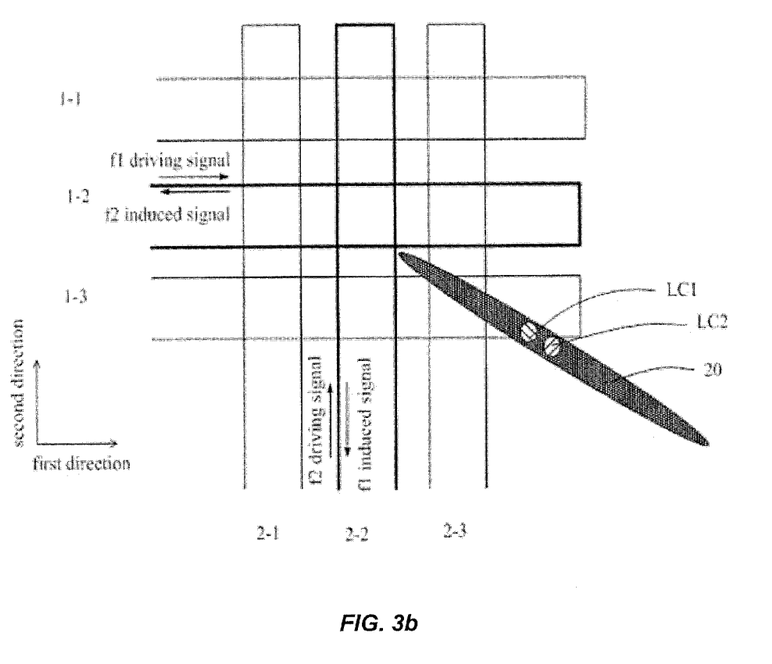
FIG. 3b illustrates a principle of driving and detecting a second one of first coils and a second one of second coils according to an embodiment of the present application.
Figure 3C:
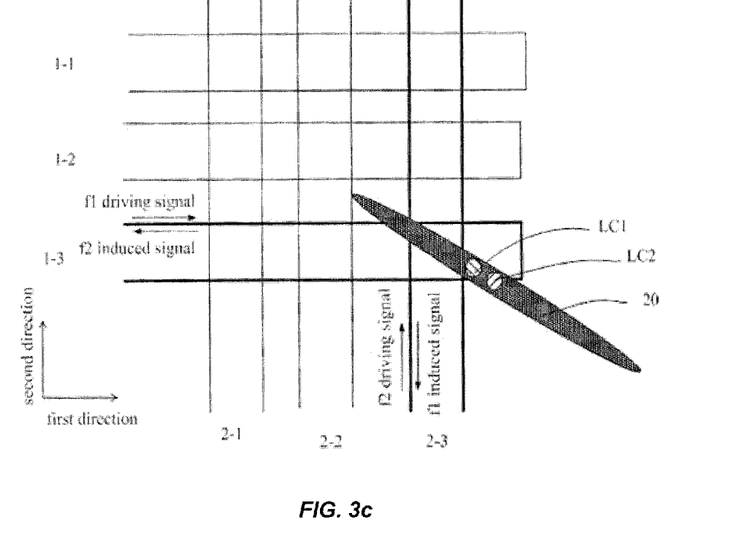
FIG. 3c illustrates a principle of driving and detecting a third one of first coils and a third one of second coils according to an embodiment of the present application.

Implementations of emitting the first electromagnetic signals E1 having the first frequency (f1) and receiving the second reflected signals R2 having the second frequency (f2), successively by the multiple first coils 1 (e.g., 1-1, 1-2, 1-3), and emitting the second electromagnetic signals E2 having the second frequency (f2) and receiving the first reflected signals R1 having the first frequency (f1), successively by the multiple second coils 2 (e.g., 2-1, 2-2, 2-3), may be referred to FIG. 3a, FIG. 3b and FIG. 3c. Firstly, as shown in FIG. 3a, the first coil 1-1 emits a first electromagnetic signal E1 having the first frequency (f1) and receives a second reflected signal R2 having the second frequency (f2); and the second coil 2-1 emits a second electromagnetic signal E2 having the second frequency (f2) and receives a first reflected signal R1 having the first frequency (f1). Then, as shown in FIG. 3b, the first coil 1-2 emits a first electromagnetic signal E1 having the first frequency (f1) and receives a second reflected signal R2 having the second frequency (f2); and the second coil 2-2 emits a second electromagnetic signal E2 having the second frequency (f2) and receives a first reflected signal R1 having the first frequency (f1). At last, as shown in FIG. 3c, the first coil 1-3 emits a first electromagnetic signal E1 having the first frequency (f1) and receives a second reflected signal R2 having the second frequency (f2); and the second coil 2-3 emits a second electromagnetic signal E2 having the second frequency (f2) and receives a first reflected signal R1 having the first frequency (f1). In this way, the entire electromagnetic-type touch panel may be scanned to detect a touch by scanning and detecting the first coils 1 and the second coils 2. Obviously, the order for scanning and detecting the first coils 1-1, 1-2 and 1-3 may be adjusted arbitrarily, as well as the order for scanning and detecting the second coils 2-1, 2-2 and 2-3, which are not detailed herein.

Operation processes of emitting a first electromagnetic signal E1 having the first frequency (f1) and receiving a second reflected signals R2 having the second frequency (f2), by one first coil (e.g., the first coil 1-1), and emitting a second electromagnetic signal E2 having the second frequency (f2) and receiving a first reflected signal R1 having the first frequency (f1), by one second coil (e.g., the second coil 2-1), may be detailed hereinafter in conjunction with FIG. 2a and FIG. 3a.

For the first coils 1 and the second coils 2, operation processes of each may include two processes: a emission process and a reception process. Correspondingly, the first resonance circuit LC1 in the electromagnetic stylus 20 receives electromagnetic signals emitted by the first coils 1 during the emission processes of the first coils 1, and generates, through resonance, reflected signals (i.e., perform reflection processes) during the reception processes of the first coils 1. The second resonance circuit LC2 in the electromagnetic stylus 20 receives electromagnetic signals emitted by the second coils 2 during the emission processes of the second coils 2 and generates, through resonance, reflected signals (i.e., perform reflection processes) during the reception processes of the second coils 2.

Emission processes and reception processes of the first coil 1-1 and the second coil 2-1 are described as follows.

A emission process of the first coil 1-1 and a reflection process of the electromagnetic stylus 20 are described as follows.

A first direction driving circuit 3-1 in the first direction driving and detecting circuit 3 provides a first driving signal (i.e., the f1 driving signal having the frequency f1) to the first coil 1-1. In actuation of the first driving signal, the first coil 1-1 emits a first electromagnetic signal E1 having the first frequency f1. After receiving the first electromagnetic signal E1 emitted from the first coil 1-1, the first resonance circuit LC1 generates, through resonance, a first reflected signal R1 having a same frequency (i.e., the first frequency f1) as the first electromagnetic signal E1 emitted by the first coil 1-1.

It should be noted that, in the application, the process of generating the electromagnetic signal through resonance by the electromagnetic stylus after receiving the electromagnetic signal is referred to as reflecting an electromagnetic signal by the electromagnetic stylus, and an electromagnetic signal emitted by the electromagnetic stylus is referred to as a reflected signal.

A emission process of the second coil 2-1 and a reflection process of the electromagnetic stylus 20 are described as follows A second direction driving circuit 4-1 in the second direction driving and detecting circuit 4 provides a second driving signal (i.e., the f2 driving signal having the frequency f2) to the second coil 2-1. In actuation of the second driving signal, the second coil 2-1 emits a second electromagnetic signal E2 having the second frequency f2. After receiving the second electromagnetic signal E2 emitted by the second coil 2-1, the second resonance circuit LC1 generates, through resonance, a second reflected signal R2 having a same frequency (i.e., the second frequency f2) as the second electromagnetic signal E2 emitted by the second coil 2-1.

A reception process of the first coil 1-1 is described as follows.

The first coil 1-1 receives the second reflected signal R2 and generates a first induced signal (i.e., the f2 induced signal having the frequency f2). A first direction driving circuit 3-2 in the first direction driving and detecting circuit 3 detects the first induced signal (e.g., an induced voltage V1-1, or an induced current) from the first coil 1-1.

A reception process of the second coil 2-1 is described as follows.

The second coil 2-1 receives the first reflected signal R1 and generates a second induced signal (i.e., the f1 induced signal having the frequency f1). A second direction driving circuit 4-2 in the second direction driving and detecting circuit 4 detects the second induced signal (e.g., an induced voltage V2-1, or an induced current) from the first coil 2-1.

Emission processes and reception processes of the first coil 1-2 and the second coil 2-2 as shown in FIG. 3b, and emission processes and reception processes of the first coil 1-3 and the second coil 2-3 as shown in FIG. 3c, may be referred to the emission processes and the reception processes of the first coil 1-1 and the second coil 2-1 as shown in FIG. 3a, which are not repeated here.

Figure 4A:
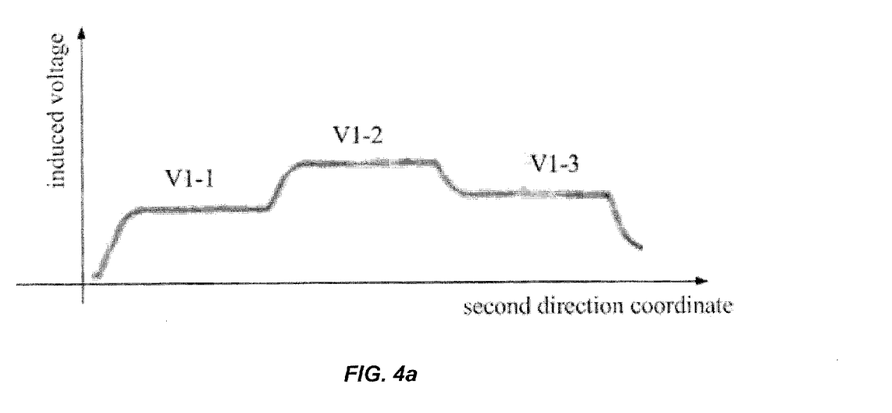
FIG. 4a is an diagram of induced voltages detected from first coils according to an embodiment of the present application.
Figure 4B:
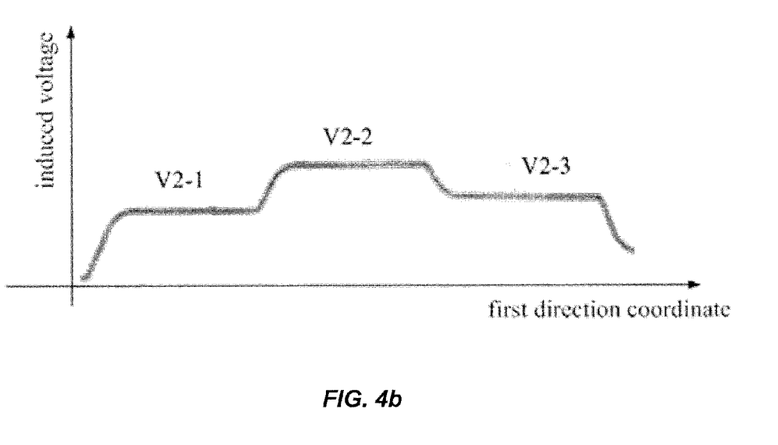
FIG. 4b is an diagram of induced voltages detected from second coils according to an embodiment of the present application.

As shown in FIG. 3a, FIG. 3b and FIG. 3c, the first coils 1-1, 1-2 and 1-3 are applied in turn with the first driving signal and are detected to obtain the corresponding first induced signals V1-1, V1-2 and V1-3 (as shown in FIG. 4a); and the second coils 2-1, 2-2 and 2-3 are applied in turn with the second driving signal and are detected to obtain the corresponding second induced signals V1-1, V1-2 and V1-3 (as shown in FIG. 4b).

The following approaches may be adopted to determine a second direction coordinate based on the first induced signals and to determine a first direction coordinate based on the second induced signals.

In a first approach, the first direction detecting circuit 3-2 in the first direction driving and detecting circuit 3 performs a quadratic function fitting on the first induced signals V1-1, V1-2 and V1-3, and a second direction coordinate value corresponding to a peak of a quadratic function obtained through the quadratic function fitting is taken as a second direction coordinate value of a touch position of the electromagnetic stylus 20. The second direction detecting circuit 4-2 in the second direction driving and detecting circuit 4 performs a quadratic function fitting on the second induced signals V2-1, V2-2 and V2-3, and a first direction coordinate value corresponding to a peak of a quadratic function obtained through the quadratic function fitting is taken as a first direction coordinate value of the touch position of the electromagnetic stylus 20.

In a second approach, the first direction detecting circuit 3-2 in the first direction driving and detecting circuit 3 selects a second direction coordinate value corresponding to a maximum among the first induced signals V1-1, V1-2 and V1-3 as a second direction coordinate value of a touch position of the electromagnetic stylus. The second direction detecting circuit 4-2 in the second direction driving and detecting circuit 4 selects a first direction coordinate value corresponding to a maximum among the second induced signals V2-1, V2-2 and V2-3 as a first direction coordinate value of the touch position of the electromagnetic stylus.

Figure 5A:
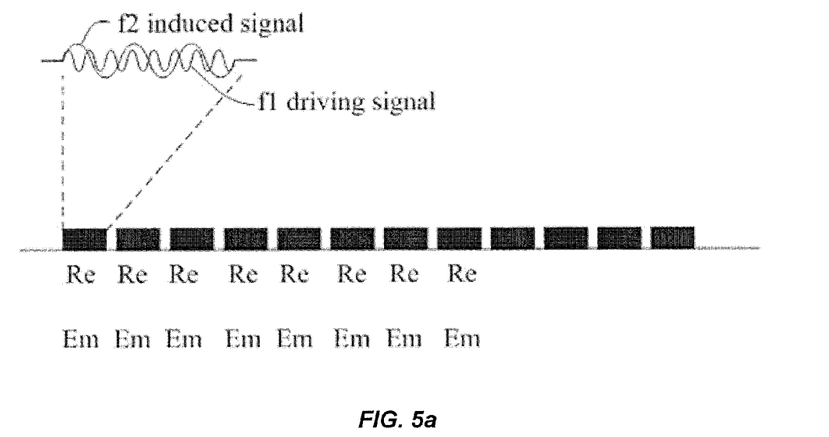
FIG. 5a is a schematic diagram of signals in the case that each first coil simultaneously performs a emission process and a reception process according to an embodiment of the present application.

According to the embodiment, each of the first coils 1 may perform the emission process and the reception process simultaneously or in a time-division way, and each of the second coils 2 may perform the emission process and the reception process simultaneously or in a time-division way. Specifically, in a first possible approach, each of the first coils 1 (e.g., 1-1, 1-2, 1-3) emits a first electromagnetic signal E1 having the first frequency f1 and receives a second reflected signals R2 having the second frequency f2 simultaneously (as shown in FIG. 5a), and each of the second coils 1 (e.g., 2-1, 2-2, 2-3) emits a second electromagnetic signal E2 having the second frequency f2 and receives the a reflected signals R1 having the first frequency f1 simultaneously. As shown in FIG. 5a, for example, each of the first coils performs multiple times of emission processes and multiple times of reception processes.

Figure 5B:
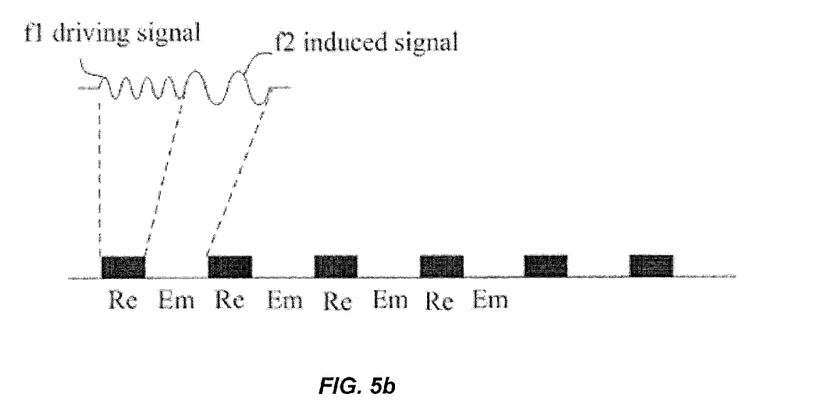
FIG. 5b is a schematic diagram of signals in the case that each first coil performs a emission process and a reception process in a time-division way according to an embodiment of the present application.

Alternatively, in a second possible approach, each of the first coils 1 (e.g., 1-1, 1-2, 1-3) emits a first electromagnetic signal E1 having the first frequency f1 and receives a second reflected signals R2 of the second frequency f2 in a time-division way (as shown in FIG. 5b), and each of the second coils 2 (e.g., 2-1, 2-2, 2-3) emits a second electromagnetic signal E2 having the second frequency f2 and receives a first reflected signals R1 having the first frequency f1 in a time-division way.

Furthermore, according to the embodiment, a correspondence between the emission processes and reception processes of the respective first coils 1, and the emission processes and reception processes of the respective second coils 2 may be described as follows.

Figure 6A:
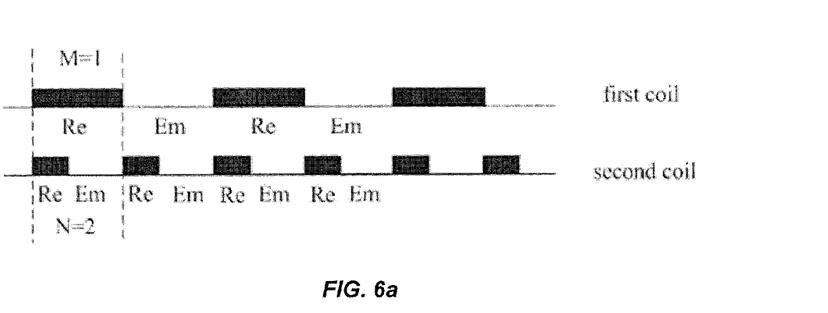
FIG. 6a is a diagram of a relative relation between emission processes and reception processes of first coils, and emission processes and reception processes of second coils according to an embodiment of the present application.

In a first manner, during emitting the first electromagnetic signal E1 having the first frequency f1 and receiving the second reflected signal R2 having the second frequency f2 for M times by the first coils 1, the second coils 2 emit the second electromagnetic signal E2 having the second frequency f2 and receive the first reflected signal R1 having the first frequency f1 for N times, where each of M and N is an integer greater than or equal to 1. As shown in FIG. 6a, it is taken as an example that M equals to 1 and N equals to 2.

Figure 6B:
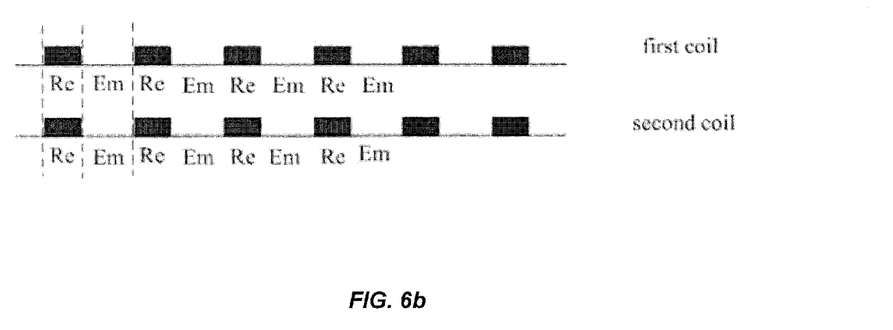
FIG. 6b is a diagram of another relative relation between emission processes and reception processes of first coils, and emission processes and reception processes of second coils according to an embodiment of the present application.
Figure 6C:
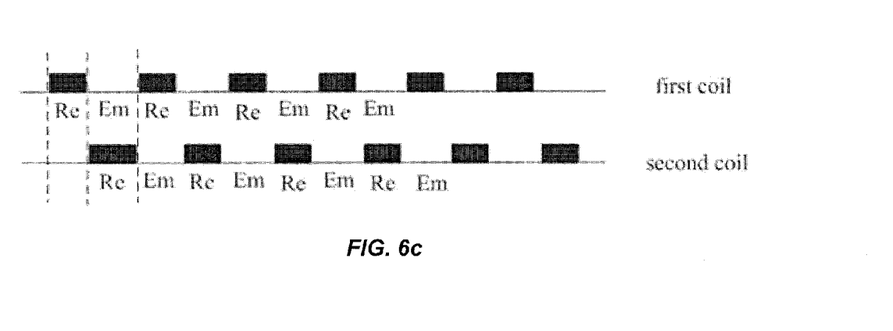
FIG. 6c is a diagram of yet another relative relation between emission processes and reception processes of first coils, and emission processes and reception processes of second coils according to an embodiment of the present application.

In a second manner, if the number of the first coils 1 is same as the number of the second coils 2, the process of emitting the first electromagnetic signals E1 having the first frequency f1 or receiving the second reflected signals R2 having the second frequency f2, by the first coils 1 is synchronous with the process of emitting the second electromagnetic signals E2 having the second frequency f2 or receiving the first reflected signals R1 having the first frequency f1, by the second coils 2. Specifically, it is possible that the process of emitting the first electromagnetic signals E1 having the first frequency f1 by the first coils 1 is synchronous with the process of emitting the second electromagnetic signals E2 having the second frequency f2 by the second coils 2 (as shown in FIG. 6b); or it is possible that the process of emitting the first electromagnetic signals E1 having the first frequency f1 by the first coils 1 is synchronous with the process of receiving the first reflected signals R1 having the first frequency f1 by the second coils 2; or it is possible that the process of receiving the second reflected signals R2 having the second frequency f2 by the first coils 1 is synchronous with the process of emitting the second electromagnetic signals E2 having the second frequency f2 by the second coils 2; or it is possible that the process of receiving the second reflected signals R2 having the second frequency f2 by the first coils 1 is synchronous with the process of receiving the first reflected signals R1 having the first frequency f1 by the second coils 2.

Figure 7:
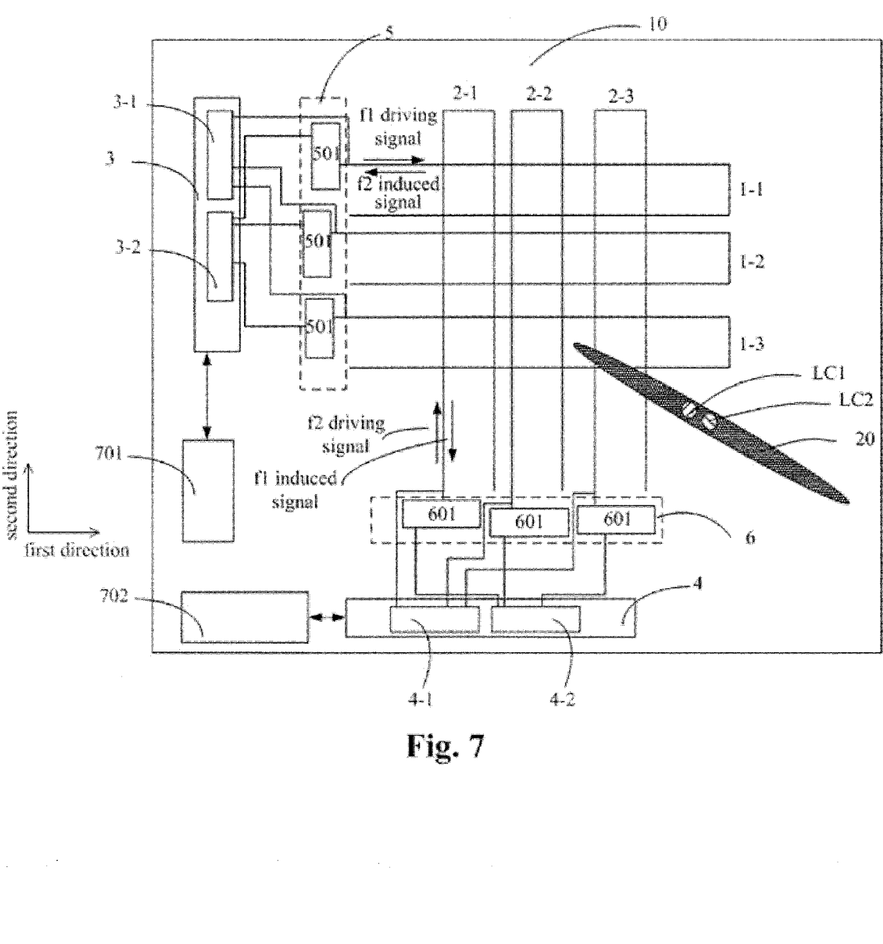
FIG. 7 is a structural schematic diagram of an electromagnetic-type touch panel having a filtering circuit and a storage unit according to an embodiment of the present application.

According to the embodiment, the first induced signal inductively generated by each of the first coils 1 includes multiple components. For example, each of the first coils 1 inductively generates an induced signal having the second frequency f2 (which is referred to as a first sub induced signal) after receiving the second reflected signal R2 having the second frequency f2. Also, each of the first coils 1 generates an induced signal having the first frequency f1 (which is referred to as a second sub induced signal) after receiving the first reflected signal R1 from the first resonance circuit LC1 in the electromagnetic stylus 20. Therefore, to improve the strength of valid signals and to improve the accuracy of detection, as shown in FIG. 7, the electromagnetic-type touch panel 10 may further include a first filtering circuit 5 for removing the induced signals having the first frequency f1 (i.e., the second sub induced signals) from the first induced signals, to obtain the induced signals having the second frequency f2 (i.e., the first sub induced signals). Specifically, the first filtering circuit 5 includes multiple first filtering units 501 electrically connected to the first coils 1 with a one-to-one correspondence. The first filtering units 501 may typically be band-pass filters. In this case, the first direction detecting circuit 3-2 in the first direction driving and detecting circuit 3 determines the second direction coordinate value of the touch position of the electromagnetic stylus 20 based on the first sub induced signals, reference of which may be made to the above description and FIG. 4a. Similarly, the second induced signal inductively generated by each of the second coils 2 includes multiple components. For example, each of the second coils 2 inductively generates an induced signal having the first frequency f1 (which is referred to as a third sub induced signal) after receiving the first reflected signal R1 having the first frequency f1. Also, each of the second coils 2 generates an induced signal having the second frequency f2 (which is referred to as a fourth sub induced signal) after receiving the second reflected signal R2 from the second resonance circuit LC2 in the electromagnetic stylus 20. Therefore, to improve the strength of valid signals and to improve the accuracy of detection, as shown in FIG. 7, the electromagnetic-type touch panel 10 may further include a second filtering circuit 6 for removing the induced signals having the second frequency f2 (i.e., the fourth sub induced signals) from the second induced signals, to obtain the induced signals having the first frequency f1 (i.e., the third sub induced signals). Specifically, the second filtering circuit 6 includes multiple second filtering units 601 electrically connected to the second coils 2 with a one-to-one correspondence. The second filtering units 601 may typically be band-pass filters. In this case, the second direction detecting circuit 4-2 in the second direction driving and detecting circuit 4 determines the first direction coordinate value of the touch position of the electromagnetic stylus 20 based on the third sub induced signals, reference of which may be made to the above description and FIG. 4b.

Furthermore, the first induced signal inductively generated by each of the first coils 1 includes an induced signal having the second frequency f2 (which is referred to as a fifth sub induced signal) inductively generated after receiving, by the each of the first coils 1, the electromagnetic signal E2 having the second frequency f2 emitted by the second coils 2. Therefore, to improve the strength of valid signals and to improve the accuracy of detection, as shown in FIG. 7, the electromagnetic-type touch panel 10 further includes a first storage unit 701 for storing the induced signals (i.e., the fifth sub induced signals) inductively generated, in the case that the electromagnetic-type touch panel 10 is not touched, by the first coils 1 due to electromagnetic signals E2 having the second frequency f2 emitted by the second coils 2. The first direction detecting circuit 3-2 in the first direction driving and detecting circuit 3 may remove at least one of the second sub induced signals and the fifth sub induced signals from the first induced signals, and then determine the second direction coordinate value of the touch position of the electromagnetic stylus 20 based on the remaining first sub induced signals, reference of which may be made to the above description and FIG. 4a. Similarly, the second induced signal inductively generated by each of the second coils 2 further includes an induced signal having the first frequency f1 (which is referred to as a sixth sub induced signal) inductively generated after receiving, by the each of the second coils 2, the electromagnetic signals E1 having the first frequency f1 emitted by the first coils 1. Therefore, to improve the strength of valid signals and to improve the accuracy of detection, as shown in FIG. 7, the electromagnetic-type touch panel 10 may further include a second storage unit 702 for storing the induced signals (i.e., the sixth sub induced signals) inductively generated, in the case that the electromagnetic-type touch panel 10 is not touched, by the second coils 2 due to the electromagnetic signals E1 having the first frequency f1 emitted by the first coils 1. The second direction detecting circuit 4-2 in the second direction driving and detecting circuit 4 may remove at least one of the fourth sub induced signals and the sixth sub induced signals from the second induced signals, and then determine the first direction coordinate value of the touch position of the electromagnetic stylus 20 based on the remaining third sub induced signals, reference of which may be made to the above description and FIG. 4a.

According to a preferred embodiment, one or any combination of the first filtering circuit 5, the second filtering circuit 6, the first storage unit 701, the second storage unit 702, the first direction driving and detecting circuit 3 and the second driving and detecting circuit 4 may be integrated into an IC chip.

A Second Embodiment

Figure 8:
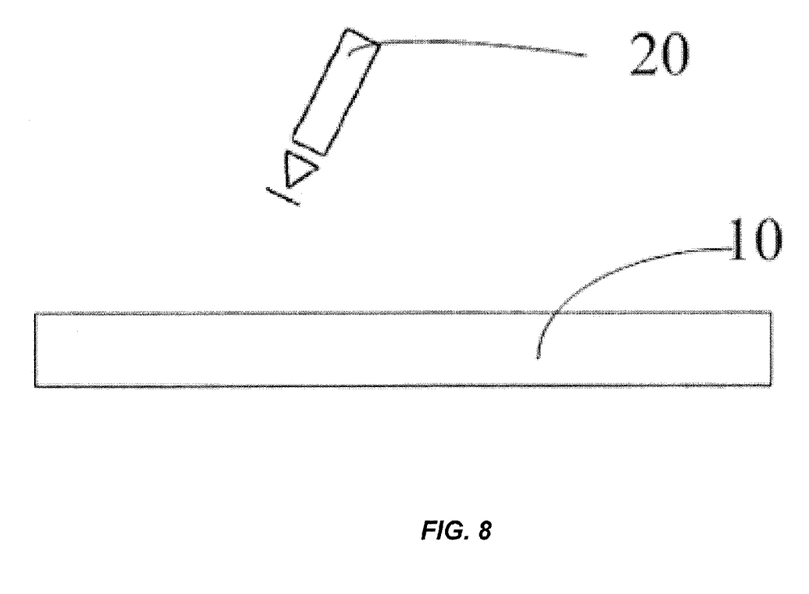
FIG. 8 is a structural schematic diagram of a coordinate input device according to an embodiment of the present application.

A coordinate input device is provided according to the second embodiment of the present application. As shown in FIG. 8, the coordinate input device includes an electromagnetic stylus 20 and the electromagnetic-type touch panel 10 according to the first embodiment.

The coordinate input device may further include a display panel (no shown in FIG. 8). The electromagnetic-type touch panel 10 and the display panel may be provided separately (an Out-cell type) or the electromagnetic-type touch panel 10 may be integrated into the display panel (an On-cell type or an In-cell type). The display panel may be a liquid crystal display panel, an electronic paper, a plasma display panel or an organic light emitting diode display panel.

Apparently, various modifications and variations may be made to the present application by those skilled in the art without departing from the spirit and the scope thereof. Thus, if these modifications and variations are within the scope of the claims of the present application or the equivalent, the present application intends to include these modification and variations.

What is claimed is:

1. An electromagnetic-type touch panel, configured to detect a touch position of an electromagnetic stylus, the electromagnetic stylus comprising:

a first resonance circuit and a second resonance circuit; and the electromagnetic-type touch panel comprising:
a plurality of first coils extending in a first direction and a plurality of second coils extending in a second direction,
wherein each of the plurality of first coils is configured to emit a first electromagnetic signal having a first frequency,
wherein each of the plurality of second coils is configured to emit a second electromagnetic signal having a second frequency different from the first frequency,
wherein the first resonance circuit of the electromagnetic stylus is configured to receive the first electromagnetic signal and reflect a first reflected signal having the first frequency,
wherein the second resonance circuit of the electromagnetic stylus is configured to receive the second electromagnetic signal and reflect a second reflected signal having the second frequency, and
wherein the plurality of first coils are configured to receive the second reflected signal, and the plurality of second coils are configured to receive the first reflected signal.

2. The electromagnetic-type touch panel according to claim 1, wherein
each of the first coils emits the first electromagnetic signal and receives the second reflected signal simultaneously; and
each of the second coils emits the second electromagnetic signal and receives the first reflected signal simultaneously.

3. The electromagnetic-type touch panel according to claim 1, wherein
each of the first coils emits the first electromagnetic signal and receives the second reflected signal according to a time-division method; and
each of the second coils emits the second electromagnetic signal and receives the first reflected signal according to a time-division method.

4. The electromagnetic-type touch panel according to claim 1, wherein the plurality of first coils emit first electromagnetic signal and receive the second reflected signal M times, the plurality of second coils emit the second electromagnetic signal and receive the first reflected signal N times, where each of M and N is an integer greater than or equal to 1.

5. The electromagnetic-type touch panel according to claim 1, wherein the number of the first coils is same as the number of the second coils, and the first coils emitting the first electromagnetic signal or receiving the second reflected signal is synchronous with the second coils emitting the second electromagnetic signal or receiving the first reflected signal.

6. The electromagnetic-type touch panel according to claim 1, further comprising:
a first direction driving and detecting circuit, configured to provide a first driving signal to and detect first induced signals from the plurality of first coils, successively; and
a second direction driving and detecting circuit, configured to provide a second driving signal to and detect second induced signals from the plurality of second coils, successively.

7. The electromagnetic-type touch panel according to claim 6, wherein the first direction driving and detecting circuit performs a first quadratic function fitting on the first induced signals, and a second direction coordinate value corresponding to a peak of a quadratic function obtained through the first quadratic function fitting is taken as a second direction coordinate value of the touch position of the electromagnetic stylus; and
the second direction driving and detecting circuit performs a second quadratic function fitting on the second induced signals, and a first direction coordinate value corresponding to a peak of a quadratic function obtained through the second quadratic function fitting is taken as a first direction coordinate value of the touch position of the electromagnetic stylus.

8. The electromagnetic-type touch panel according to claim 6, wherein the first direction driving and detecting circuit is configured to select a second direction coordinate value corresponding to a maximum of the first induced signals as a second direction coordinate value of the touch position of the electromagnetic stylus; and
the second direction driving and detecting circuit is configured to select a first direction coordinate value corresponding to a maximum of the second induced signals as a first direction coordinate value of the touch position of the electromagnetic stylus.

9. The electromagnetic-type touch panel according to claim 6, further comprising:
a first filtering circuit, configured to remove induced signals having the first frequency from the first induced signals; and
a second filtering circuit, configured to remove induced signals having the second frequency from the second induced signals.

10. The electromagnetic-type touch panel according to claim 6, further comprising:
a first storage unit, configured to, in the case that the electromagnetic-type touch panel is not touched, store induced signals inductively generated with the first coils as a consequence of electromagnetic signal having the second frequency emitted by the second coils; and
a second storage unit, configured to, in the case that the electromagnetic-type touch panel is not touched, store induced signals inductively generated with the second coils as a consequence of electromagnetic signal having the first frequency emitted by the first coils.

11. A coordinate input device, comprising:
an electromagnetic-type touch panel including a plurality of first coils extending in a first direction and a plurality of second coils extending in a second direction; and
an electromagnetic stylus including a first resonance circuit and a second resonance circuit,
wherein the electromagnetic-type touch panel is configured to detect a touch position of the electromagnetic stylus,
wherein each of the plurality of first coils is configured to emit a first electromagnetic signal having a first frequency,
wherein each of the plurality of second coils is configured to emit a second electromagnetic signal having a second frequency different from the first frequency,
wherein the first resonance circuit of the electromagnetic stylus is configured to receive the first electromagnetic signal and reflect a first reflected signal having the first frequency,
wherein the second resonance circuit of the electromagnetic stylus is configured to receive the second electromagnetic signal and reflect a second reflected signal having the second frequency, and wherein the plurality of first coils are configured to receive the second reflected signal, and the plurality of second coils are configured to receive the first reflected signal.

12. A method of driving and detecting an electromagnetic-type touch panel, configured to detect a touch position of an electromagnetic stylus, wherein the method comprises:

successively applying a first driving signal to and detecting first induced signals from a plurality of first coils extending in a first direction in the electromagnetic-type touch panel; and successively applying a second driving signal to and detecting second induced signals from a plurality of second coils extending in a second direction in the electromagnetic-type touch panel, wherein each of the first coils is configured to emit a first electromagnetic signal having a first frequency, wherein each of the plurality of second coils is configured to emit a second electromagnetic signal having a second frequency different from the first frequency, wherein the first resonance circuit of the electromagnetic stylus is configured to receive the first electromagnetic signal and reflect a first reflected signal having the first frequency, wherein the second resonance circuit of the electromagnetic stylus is configured to receive the second electromagnetic signal and reflect a second reflected signal having the second frequency, and wherein the plurality of first coils are configured to receive the reflected second signal, and the plurality of second coils are configured to receive the reflected first signal.

13. The method of driving and detecting the electromagnetic-type touch panel according to claim 12, wherein:

each of the first coils is configured to emit the first electromagnetic signal and to receive the second reflected signal simultaneously; and each of the second coils is configured to emit the second electromagnetic signal and to receive the first reflected signal simultaneously.

14. The method of driving and detecting the electromagnetic-type touch panel according to claim 12, wherein:

each of the first coils is configured to emit the first electromagnetic signal and to receive the second reflected signal according to a time-division method; and each of the second coils is configured to emit the second electromagnetic signal and to receive the first reflected signal according to a time-division method.

15. The method of driving and detecting the electromagnetic-type touch panel according to claim 12, wherein while emitting the first electromagnetic signal and receiving the second reflected signal M times, the second coils emit the second electromagnetic signal and receive the first reflected signal N times, where each of M and N is an integer greater than or equal to 1.

16. The method of driving and detecting the electromagnetic-type touch panel according to claim 12, wherein the number of the first coils is same as the number of the second coils, and the emitting of the first electromagnetic signal or receiving the second reflected signal is synchronous with the emitting of the second electromagnetic signal or receiving the first reflected signal.

17. The method of driving and detecting the electromagnetic-type touch panel according to claim 12, further comprising:

performing a quadratic function fitting on the first induced signals, and taking a second direction coordinate value corresponding to a peak of a quadratic function obtained through the quadratic function fitting as a second direction coordinate value of the touch position of the electromagnetic stylus; and performing a quadratic function fitting on the first induced signals, and taking a first direction coordinate value corresponding to a peak of a quadratic function obtained through the quadratic function fitting as a first direction coordinate value of the touch position of the electromagnetic stylus.

18. The method of driving and detecting the electromagnetic-type touch panel according to claim 12, further comprising:

selecting a second direction coordinate value corresponding to a maximum of the first induced signals as a second direction coordinate value of the touch position of the electromagnetic stylus; and selecting a first direction coordinate value corresponding to a maximum of the second induced signals as a first direction coordinate value of the touch position of the electromagnetic stylus.

19. The method of driving and detecting the electromagnetic-type touch panel according to claim 12, further comprising:

removing signals having the first frequency from the first induced signals; and removing signals having the second frequency from the second induced signals.

20. The method of driving and detecting the electromagnetic-type touch panel according to claim 12, further comprising: when the electromagnetic-type touch panel is not touched, removing an inductively generated signal having the second frequency from the first coils; and removing an inductively generated signal having the first frequency from the second coils.

* * * * *